(12) United States Patent
Elnozahy et al.

(10) Patent No.: US 9,292,662 B2
(45) Date of Patent: Mar. 22, 2016

(54) METHOD OF EXPLOITING SPARE PROCESSORS TO REDUCE ENERGY CONSUMPTION

(75) Inventors: Elmootazbellah N. Elnozahy, Austin, TX (US); Heather L. Hanson, Austin, TX (US); Freeman L. Rawson, III, Austin, TX (US); Malcolm S. Ware, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1481 days.

(21) Appl. No.: 12/640,198

(22) Filed: Dec. 17, 2009

(65) Prior Publication Data

US 2011/0154348 A1  Jun. 23, 2011

(51) Int. Cl.
*G06F 21/00* (2013.01)
*G06F 21/10* (2013.01)
*G06F 1/32* (2006.01)
*G06F 9/50* (2006.01)

(52) U.S. Cl.
CPC .............. *G06F 21/10* (2013.01); *G06F 1/324* (2013.01); *G06F 1/3296* (2013.01); *G06F 9/5094* (2013.01); *Y02B 60/1217* (2013.01); *Y02B 60/1285* (2013.01); *Y02B 60/142* (2013.01)

(58) Field of Classification Search
USPC ........................................... 705/59
See application file for complete search history.

(56) References Cited

U.S. PATENT DOCUMENTS

| 6,964,539 | B2 | 11/2005 | Bradley et al. |
| 2003/0056125 | A1 | 3/2003 | O'Conner et al. |
| 2006/0136761 | A1* | 6/2006 | Frasier et al. ........... G06F 9/505 713/320 |
| 2006/0149985 | A1* | 7/2006 | Dubinsky ..................... 713/324 |
| 2006/0253715 | A1* | 11/2006 | Ghiasi et al. .................. 713/300 |
| 2007/0266119 | A1* | 11/2007 | Ohly ............................ 709/220 |
| 2007/0294557 | A1 | 12/2007 | Dubinsky |
| 2008/0072079 | A1 | 3/2008 | Bieswanger et al. |

* cited by examiner

*Primary Examiner* — Zeshan Qayyum
(74) *Attorney, Agent, or Firm* — Shimokaji IP

(57) ABSTRACT

A method, system, and computer program product for reducing power and energy consumption in a server system with multiple processor cores is disclosed. The system may include an operating system for scheduling user workloads among a processor pool. The processor pool may include active licensed processor cores and inactive unlicensed processor cores. The method and computer program product may reduce power and energy consumption by including steps and sets of instructions activating spare cores and adjusting the operating frequency of processor cores, including the newly activated spare cores to provide equivalent computing resources as the original licensed cores operating at a specified clock frequency.

6 Claims, 4 Drawing Sheets

METHOD OF EXPLOITING SPARE PROCESSORS TO REDUCE ENERGY CONSUMPTION

BACKGROUND OF THE INVENTION

The present invention relates generally to the field of server power management, and more specifically, to the power and energy management of server systems with multiple processor cores.

Server systems typically include a plurality of processor cores. Some server systems may license a predetermined number of processor cores depending on the expressed needs of the customer and further include spare processor cores that may be left inactive and unlicensed until the customer's needs increase, or until the spare is used as a replacement in the event of a failure of another core.

Many server systems are equipped with power, thermal, and energy management features such as dynamic voltage and frequency scaling (DVFS). It is known for server systems to run processor cores at various frequencies where a processor frequency comprises a base value and a multiple of a certain frequency step value. The voltage level may be adjusted in concert with the frequency. The frequency scaling of the processors affects the server's performance and power consumption. Dynamic frequency and voltage scaling allows power and performance optimizations tailored to workload, user preferences, power constraints, and other factors. During normal operation, maximum performance is obtained by operating the processors of the server at the maximum frequency designated by the server manufacturer. Lower power consumption may be obtained by operating the processors of the server at frequencies less than maximum frequencies.

As can be seen, there is an advantage for a method and system that manages power resources in a server system by varying frequency and voltage of the licensed processor cores.

SUMMARY OF THE INVENTION

In one aspect, the present invention comprises a system, including a server; a list of tasks to be performed on the server; a processor pool of one or more active and licensed processors and one or more inactive and unlicensed processors; and a computer-readable medium connected to the processors configured to adjust the frequency and voltage of each respective licensed and unlicensed processors to reduce energy and power consumption during performance of tasks in the list of tasks.

In another aspect, the present invention comprises a method of managing power resources on a server system including a processor pool of licensed and unlicensed processors, wherein the method comprises the steps of determining a processor minimum operating frequency; determining a processor maximum operating frequency; determining the number of processor cycles employed by the operation of the licensed processors without one or more of the unlicensed processors being in operation; activating one or more unlicensed processors within the processor pool; and adjusting clock frequencies of the licensed processors and the one or more activated unlicensed processors to operate so as to produce substantially the same number of processor cycles determined during operation of the licensed processors without the one or more unlicensed processors wherein activation of the unlicensed processor does not drop the operation frequency of each respective processor below the minimum operating frequency and wherein activation of the unlicensed processor does not raise the operation frequency of each respective processor above the maximum operating frequency.

In a further aspect, the present invention comprises a method of managing power resources on a server system, wherein the method comprises the steps of checking if there is a task available in a process queue; determining if there is at least one free idle processor available within a processor pool to allocate the task to; determining if the number of processors with user-specified frequencies is less than or equal to a number of processors licensed by a user; computing an operating frequency for running the task within a licensed capacity of the server system; removing an identified available processor from a queue of idle processors; activating said identified available processor; and scheduling the task for operation within the server wherein the task is allocated to the available processor.

In a further aspect, the present invention comprises a computer program product for managing power resources on a server system, comprising a computer-usable medium having computer-usable program code embodied therewith, wherein the computer-usable program code comprises a set of instructions for determining a processor minimum operating frequency; a set of instructions for determining a number of processor cycles employed by the operation of a one or more licensed processors in a processor pool without one or more unlicensed processors being in operation; a set of instructions for computing a processor maximum frequency for running a task within a licensed capacity of the server; a set of instructions for activating an unlicensed and inactive processor within the processor pool to run the task; and a set of instructions for adjusting processor frequencies of the licensed processors and the activated unlicensed processor to operate producing the same number of processor cycles determined during operation of the licensed processors without the unlicensed processor wherein activation of the unlicensed processor does not drop the operating frequency of each respective processor below the minimum operating frequency and wherein activation of the unlicensed processor does not raise the operating frequency of each respective processor above the maximum operating frequency.

These and other features, aspects and advantages of the present invention will become better understood with reference to the following drawings, description and claims.

DETAILED DESCRIPTION OF THE INVENTION

Figure 1:
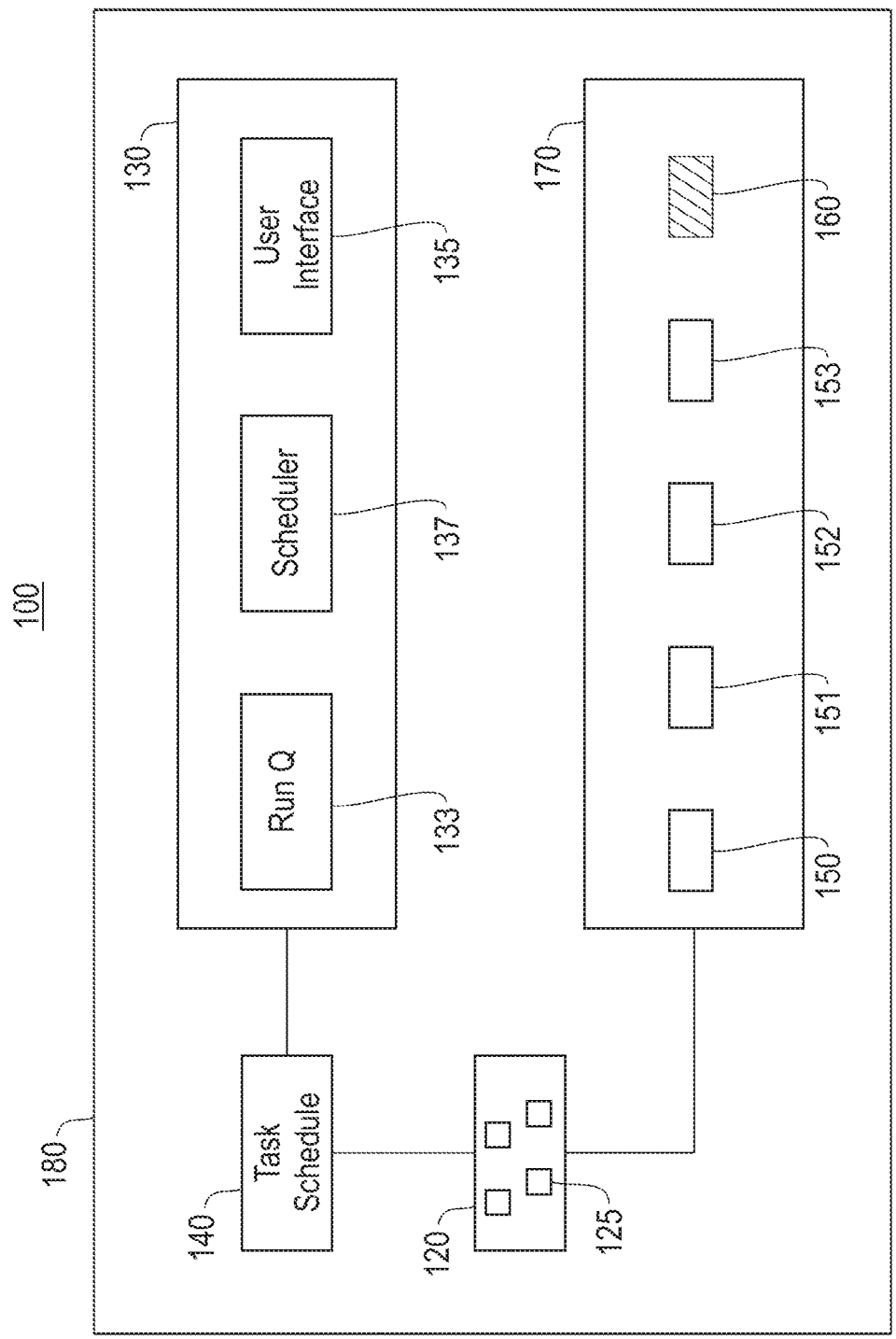
FIG. 1 illustrates a system in accordance with an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a system, a method, or a computer program product for managing power in systems designed with spare processor cores in addition to previously licensed and provided processor cores. In some cases, operating at reduced frequency and voltage levels may reduce energy consumption. For example, a system with capabilities for dynamic voltage and frequency scaling (DVFS) may be operated in a manner to allow the server to trade potentially lower performance in return for lower power consumption by reducing the operating frequency and voltage. Processors operating at higher voltage and frequencies generally consume more power than operating at lower voltage and frequencies. Power consumption is a non-linear function of voltage and frequency. Thus, according to exemplary embodiments of the present invention, using more processor cores at lower frequencies may perform the same amount of computation as fewer cores at higher frequencies while providing the additional benefit of reducing power. Server systems may utilize spare cores that are dormant for operation as replacements of faulty processor cores. In other instances, a server system may include pools of licensed and unlicensed processor cores providing the opportunity for a capacity upgrade on demand where for example, a customer may pay additional licensing fees to add one or more spare cores to the pool of licensed cores. In either exemplary instance, a spare core may be thought of as inactive and unavailable for computation until activated after being licensed. The granting of the license can be done automatically in the system if a faulty processor is detected, in which case the faulty processor is taken offline and the spare processor becomes a replacement. The granting of license can be done at the user request upon paying additional fees in the second case when a capacity upgrade is needed. The capacity upgrade can be permanent or temporary.

In one exemplary embodiment, the focus is on the case where normal operation proceeds without failure and when the spare processors have not been licensed. An operating system (OS) may add unlicensed spare cores to the pool of available processors when doing so may be beneficial for power or energy management. The OS chooses frequencies such that the aggregate effect for frequencies of all active cores, licensed or unlicensed, may be equivalent to the operation on the licensed cores only.

The selection of the number of processor cores with which to perform work and the clock frequency for each varies by system capabilities, power and energy constraints, workload behavior, user preferences, operating system policies, and other factors. The operating system segregates workloads into classes according to their performance requirements. For example, the performance requirement in some cases is for the workloads to finish as fast as possible. For applications whose performance is directly related to processor frequency, completing the job as fast as possible requires operation at high frequencies. In contrast, memory-bound or input/output (I/O) bound workloads such as Web hosting may be less sensitive to frequency and exhibit less performance benefit from higher frequencies. The user may specify that workloads run at a frequency lower than the maximum value to obtain desired levels of performance while reducing the power or energy consumed.

It may be desirable for parallel workloads to use multiple processor cores, each at a reduced frequency. The client may specify frequencies for each processor core if optimal values are known, or indicate only the workload tasks to run without assigning frequencies.

Workloads such as system daemons and lower-priority background jobs may not have clear performance requirements, and workloads may not have clear indications of performance frequency sensitivity to specify a certain required frequency. Also, the user may not specify precisely the performance of each workload within a certain class, as long as a reasonable rate of performance is obtained. In such cases, it is satisfactory for the system to run these workloads at any frequency on a capacity-available basis.

Thus, exemplary embodiments in accordance with the present invention may accommodate workloads that require a user-specified frequency within the valid range of frequencies and workloads that are permitted to run at any frequency. The option of using unlicensed spare cores in the pool of available processor resources at reduced frequencies thus provides flexibility to offer an aggregate number of processor cycles equivalent to the contracted amount of resources defined by the number of licensed cores, and provide further benefit of reduced energy and power consumption.

It may be appreciated that methods according to the exemplary embodiments described may classify workloads according to their processing needs. For high priority, compute-intensive workloads, the system may seek to complete each of these workloads in the least possible amount of time per individual task. Therefore, such workloads may be run at fast processor speeds to honor the user's expectation of system performance. Other workloads may not present such stringent performance requirements, and therefore it may be beneficial to run them at lower frequencies and voltages to reduce energy consumption while obtaining the desired performance. For example, memory-bound workloads may be more sensitive to the memory bandwidth of the processor and will not benefit from increased frequency. It may be desirable to have a spectrum of desired frequencies. Such spectrum of frequencies may be conveniently picked to match the different discrete frequencies of a processor family, each with a corresponding appropriate voltage for the chosen frequency. Further yet, it may be also desirable to allow the user the flexibility of not designating a specific frequency for a certain class of workloads, where it may be desirable to run them as the capacity of the system allows. For these workloads, the system may seek to run them such that a maximum number of these workloads is completed within a given period of time, thus improving the throughput of the system irrespective of the amount of time that each individual workload takes to complete.

Therefore, it may be beneficial to honor the frequency designation of workloads for which the user specifies or implies a desired level of performance. Under one exemplary embodiment, the system may provide the use of more processors than the number of licensed cores by incorporating spare processors into the pool of available cores and adjusting frequency as necessary to provide up to the total contracted number of processor cycles. This may be profitable from a power consumption standpoint because the processor cores may use DVFS to reduce the frequency and corresponding voltage, which tends to reduce power consumed by more than a linear factor in the voltage reduction.

Additionally, exemplary embodiments may manage power or energy resources in a server system that handles a mix of workloads with or without user-specified frequency of operation. Still yet, exemplary embodiments deactivate licensed and unlicensed cores when the workload requirements fall below the processing capacity of the system, such that only a subset of cores are used, potentially with DVFS, to reduce the power or energy consumption even further.

Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performance system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, an exemplary system 100 depicts a block diagram illustrating the flow of tasks 125, to be performed on processor cores 150; 151; 152; 153 and 160 within a server 180. A computer-readable medium such as an operating system (OS) 130 may receive as input a list of tasks 120 composed of a one or more jobs or tasks 125, and generate a task schedule 140 for these tasks to execute on processor cores 150; 151; 152; 153 and 160. The processor pool 170 may be comprised of active and licensed processor cores and inactive spare unlicensed processor cores. In this exemplary embodiment, four active processor cores 150-153 and one spare processor core 160 are shown.

In operation, a client, such as a user or system administrator, may submit one or more tasks 125 such that each task may be designated with a desired processor operating frequency, or designated a default value stored in the list of tasks 120 that gives the system 100 flexibility in choosing the most appropriate frequency that would yield the best tradeoff between performance and power and/or energy consumption. The client may specify a core operating frequency for each task 125 from a range of available frequencies, $f_1$, $f_2$ ... up to the maximum frequency an OS 130 may assign, frequency $f_m$. The frequency designation $f_0$ indicates no expressed frequency preference.

The OS 130 may be used to schedule workloads on the processors in the processor pool 170. The OS 130 may receive input from a user interface (UI) 135 for submitting the task 125 and the corresponding frequency; that is, the most appropriate frequency that would yield the best tradeoff between performance and power or energy consumption. The OS 130 may include a process queue 133, RunQ in which the tasks 125 may be queued up for processing according to a scheduling algorithm 137 of the operating system 130. The OS 130 may evaluate the list of tasks 120 and associated frequencies for each task 125 to create a task schedule 140 that maps the tasks 125 executing at specific frequencies onto the processor pool 170. The OS 130 may store values representing the maximum processor frequency and the number of licensed processors (150-153) contracted for use in the system 100. The maximum processor frequency may be a value specified by the manufacturer of the system 100 as a safe operating frequency for all workloads. In one exemplary embodiment, the contracted capacity is based on the maximum frequency safe for all workloads, called frequency $f_m$. It is known that the highest possible clock frequencies achievable under some conditions, referred to as "turbo frequencies" by some computer vendors, may be greater than frequency $f_m$. Other embodiments may base the contracted capacity on the "turbo frequency" or other frequencies. The OS 130 also determines the number of processor cycles in use for the number of licensed processors (150-153) active at any given time, and the maximum number of processor cycles allowed under a contracted agreement.

The OS 130 may turn on or activate the spare processor core 160 to operate alongside the licensed processors (150-153) in the processor pool 170. The OS 130 may also adjust processor core clock frequencies such that the available cycles of the expanded system are equivalent to substantially the same number of processor cycles in the contracted system consisting only of the active processor cores 150-153. In other words, the four previously active processor cores 150-153 and the single newly enabled processor core 160 become five active processor cores with substantially the same capacity in terms of processor cycles as the original number of active, licensed cores. The core clock frequencies of all licensed processor cores 150-153 without current explicit frequency designation may be adjusted when the previously inactive, now activated, spare processor core 160 is considered for operation in conjunction with the four active licensed processor cores 150-153. In some cases, the frequency of each core is identical whereas in other cases the frequencies may not be identical among all cores. Methods according to exemplary embodiments of the present invention may ensure that no more than the contracted number of processor cycles are scheduled at once.

Figure 2:
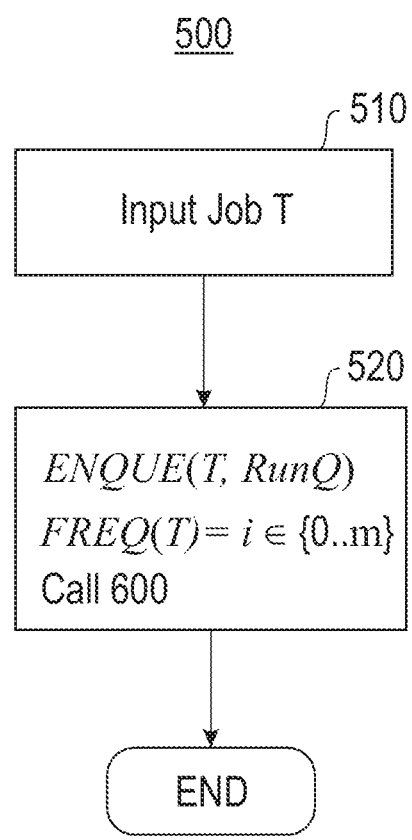
FIG. 2 is a flowchart illustrating a method of submitting jobs into the processors in accordance with another exemplary embodiment of the present invention.
Figure 3:
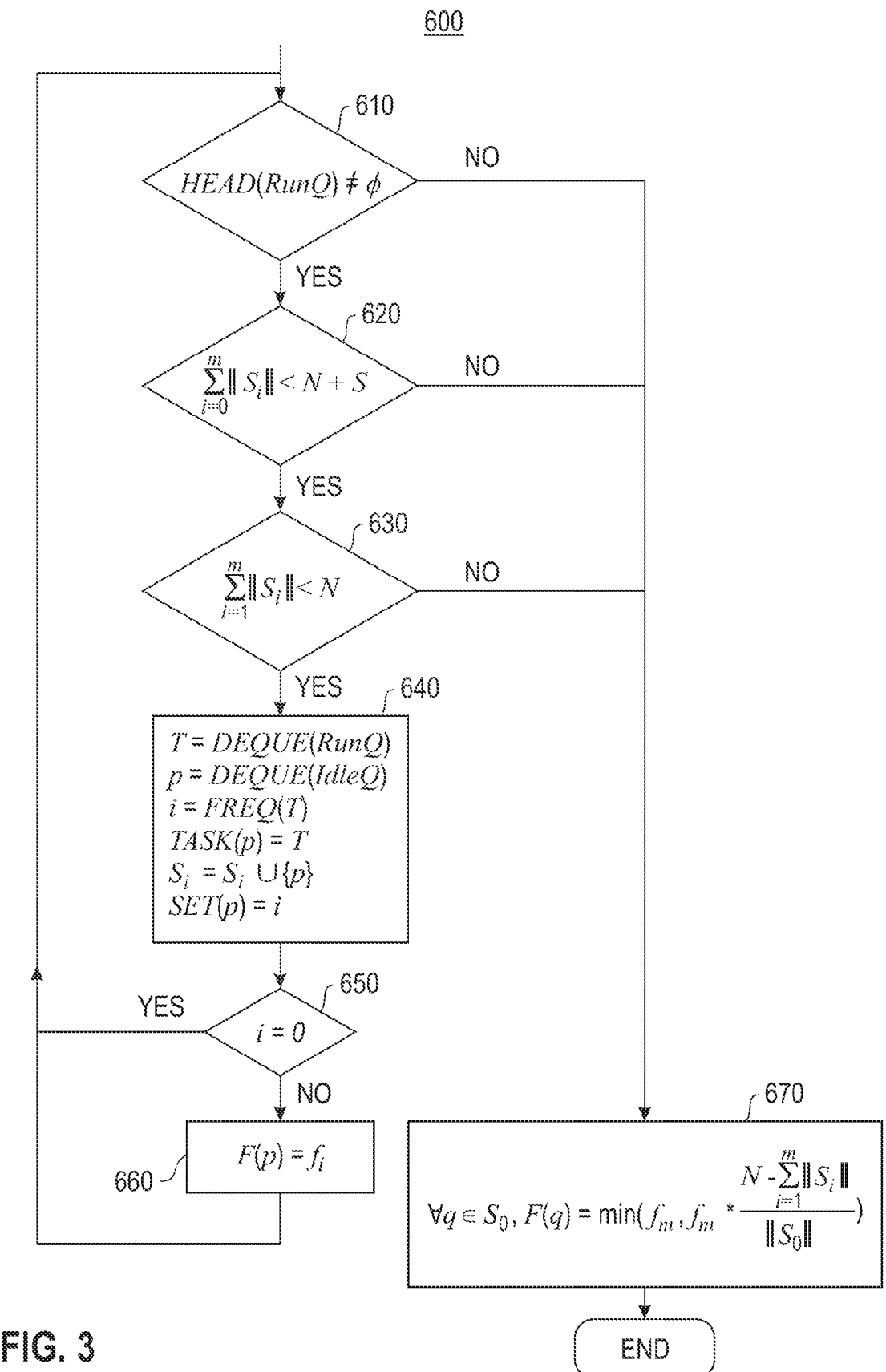
FIG. 3 is a flowchart illustrating a method for extending a task scheduler of an operating system to schedule jobs on licensed and unlicensed cores in accordance with another exemplary embodiment of the present invention.
Figure 4:
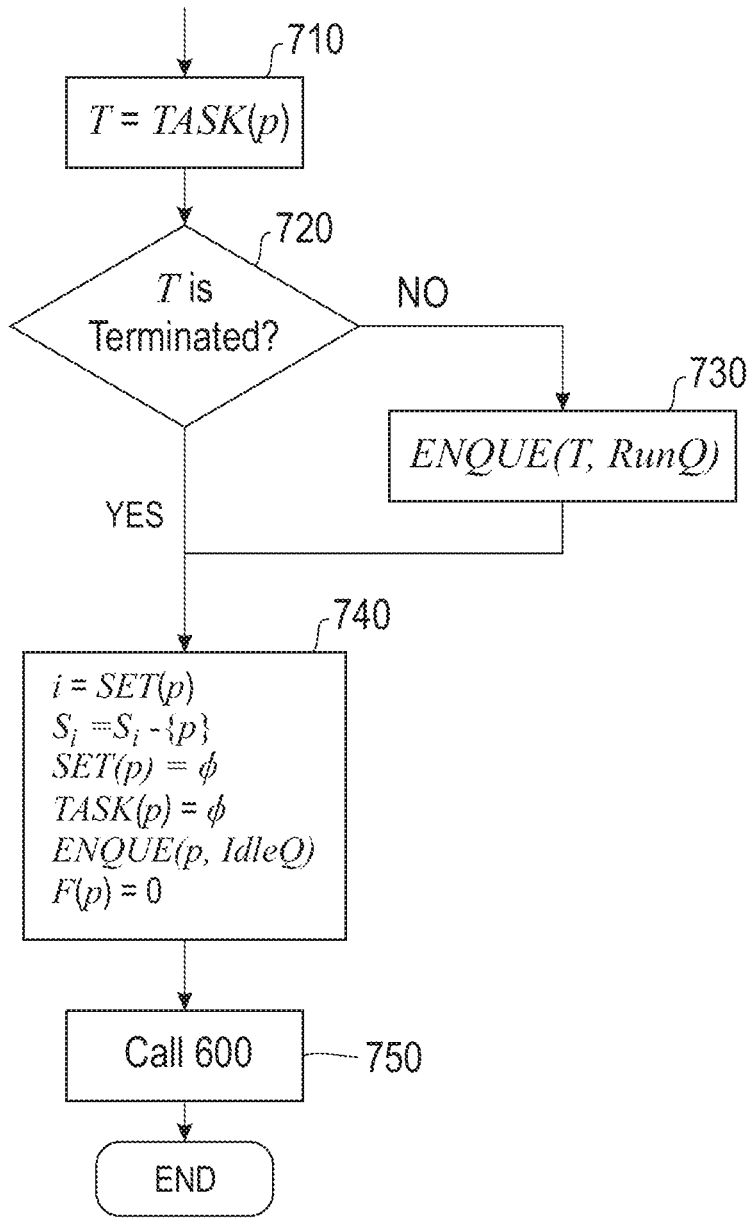
FIG. 4 is a flowchart illustrating a method for de-allocating a task from a processor in accordance with an exemplary embodiment of the present invention.

The present invention can be further explained with the aid of flowcharts depicting methods 500, 600 and 700 in FIGS. 2, 3, and 4.

Referring to FIGS. 1 and 2, the method 500 shows in general, a mechanism for job submission according to one exemplary embodiment of the present invention. The insertion of a job 125 from the task list 120 into the system 100 allows the optional designation of a desired frequency from the set $f_1, f_2, \ldots, f_m$ to run a task T (125). The frequency $f_1$ is the minimum frequency assigned by the OS 130 and frequency $f_m$ is the maximum frequency assigned by the OS. It is possible also to designate a special value $f_0$ to indicate that there is no preference for running the input task 120 at any particular frequency. The submission proceeds by presenting the task (125) T in step 510 to the operating system 130. In step 520, the operating system 130 may insert the task (125) T into the process queue 133, RunQ. The OS 130 may maintain an array FREQ that holds for each task the user-specified frequency at which task (125) T should run. Then, a call may be made to a routine for scheduling a task 125 onto a processor which will be illustrated according to a method 600 (shown in FIG. 3). From an implementation point of view, a task 125 can be inserted either through an input device (e.g. keyboard) or can be created by other tasks that already exist. Created tasks may be understood to inherit the frequency designation of their parent tasks unless specified otherwise by the user 110.

Referring to FIGS. 1 and 3, a method 600 shows an exemplary implementation of the operating system task schedule 140 that may be employed by the present invention as depicted in the flowchart. This flowchart illustrates method steps which may be invoked right after a new task 125 has been inserted into the process queue 133 (see step 520 of flowchart 500), or when a task has been preempted (see step 750 of flowchart 700). A task 125 can be preempted regularly upon a timer to support pre-emptive scheduling, or when a task currently running on a CPU relinquishes control either by initiating an I/O operation or generating an exception or control can be preempted when an I/O request is completed. The flowchart of method 600 depicts an exemplary embodiment for a single software thread per hardware core, known in the art as single-threaded mode. When the task schedule 140 is invoked there are three tests that may occur first before admitting any new tasks 125 into operation by the available processor pool 170. In step 610, a check is made to determine whether there is a task 125 available in the process queue 133. If not, the task schedule 140 has nothing more to do at this time and the method proceeds to the last step 670. If there is a task 125 available, then in step 620 a determination may be made examining if there is at least one free idle processor available among the processor pool 170 to allocate to the task 125 at the head of the process queue 133. In performing this check, an exemplary equation may be used where one may designate m sets such that set $S_i$ contains all processors that are running a task at frequency $f_i$. Additionally, $S_0$ may be the set to include all processors (150-153) that are running tasks for which no particular frequency was designated. The notation $\|S_i\|$ may denote the number of processors in set $S_i$. The determination made in step 620 effectively counts all processors (150-153) that are currently running tasks 125, and ensures this number is less than the sum of the total number of licensed processors (150-153) N and the total number of spare processors (160) S. If this determination shows that there are no more available processors at this time, then the method may proceed to step 670.

In step 630, a check may be made determining if the number of processors allocated for user-assigned frequencies is less than or equal to the number of processors licensed by a user. Step 630 may be invoked in an effort to ensure that the user can not assign tasks 125 concurrently on more than the number of licensed cores (150-153) in the system 100. In other words, step 630 prevents the user from intentionally licensing fewer cores than necessary to perform the desired number of parallel tasks concurrently. An exemplary computation used in performing this determination may be done by summing only the number of processors that are running tasks at user-specified frequencies, $\|S_i\|$, for i=1 to m. Thus, the total number of assigned tasks 125 being run may be checked against the number of licensed processors (150-153) contractually available for processing.

It may be appreciated that this arrangement may allow the user to run tasks 125 at lower frequencies, consuming less than the licensed capacity of the system 100 in terms of processor cycles. Running tasks 125 at lower frequencies may be acceptable as long as the produced schedule honors the frequency choices expressed by the user. The inclusion of this determination may protect the vendor by preventing a user from using spare unlicensed cores 160 to obtain more processing capacity than the licensed system would permit. The determination may also honor the user's energy and power management policies in effect. Thus, the method 600 may allow for work to be performed in parallel on both licensed and spare cores for tasks without explicit frequencies, on a best-effort basis. If the determination in step 630 fails, method 600 may proceed to step 670. If the determination shows that the licensed resources are available, then the admission of the new task 125 into the system 100 proceeds according to the actions in step 640.

In step 640 the OS 130 may get the task 125 off the process queue 133 and into operation within the processor pool 170. The DEQUE operation achieves this according to the scheduling algorithm 137 implemented by the operating system 130. The scheduling algorithm 137 may employ scheduling mechanisms such as, priority-based, roundrobin, etc. A processor p may be removed from the idle queue idleQ, and the specific frequency level to run the task 125 may be computed by examining the value FREQ(T). FREQ(T) may be an integer value from the range 0 to m that corresponds to a valid operating frequency. The processor p is then allocated to run the task (125) T and the corresponding set $S_i$ may be updated to include processor p, and a pointer from the processor data structure "SET" may be made to the value i to indicate the frequency at which the processor should be running the task 125.

In step 650 a determination may be made to see if the task 125 has a user-specified frequency or not. This may be done by examining if the value of i was set to 0 or not in step 520. If a user-specified frequency is present, indicated by a value of i not equal to 0 in step 520, then the frequency of the processor F(p) is set to $f_i$ in step 660 before the method 600 proceeds back to step 610. If a user-specified is not present, indicated by a value of i equal to 0, the method returns to step 610 without setting a new specified frequency. The method may loop back to step 610 to see if it is possible to schedule another task 125 on another available processor. Thus, when it is determined that there are no more tasks 125 available in the process queue 133, there are no more processors available to do work, or the number of jobs with user-specified frequencies has reached the maximum allowed number, then the method may move on to step 670.

In step 670, processor speeds may be adjusted for the processors running tasks 125 for which no specific frequency was designated by the user. This may be done in a manner to ensure that the total allocated number of processor cycles would not exceed the number of cycles if only the licensed cores (150-153) were running. Processor speed adjustment may be accomplished by computing the capacity that would have been remaining on the licensed cores (150-153) after all tasks 125 with user-specified frequencies have been accommodated at their respective frequencies. The remaining cycles may then be distributed over all tasks 125 without user-specified frequencies. Such frequencies should not exceed the maximum $f_m$. In operation, distributing the remaining processor cycles over all tasks without user-specified frequencies may incorporate spare processors. It is possible in certain circumstances for the number of available processor cycles remaining after accounting for tasks with user-specified frequencies to be less than the cycles required to run tasks in set $S_0$ at the minimum valid frequency. In such cases, one exemplary embodiment may remove tasks from set $S_0$ and reschedule them in a future scheduling period. In another exemplary embodiment, tasks may be removed from set $S_0$ one at time and rescheduled in a future scheduling period, and the frequency computation re-evaluated until either there are no remaining tasks in set $S_0$ or the computed frequency is within a valid frequency range. It should be understood that tasks without user-specified frequencies will be performed on a "best effort" basis with no performance guarantees. It is also possible for step 670 to compute a frequency that does not match any of the frequencies $f_i$ where i=1 . . . m. In this case, it may be desirable to pick the frequency $f_i$ that is just below the computed value.

Referring now to FIGS. 1 and 4, a method 700 is shown in flowchart format depicting the steps taken while pre-empting or deallocating a task 125 from the system 100. In step 710, the identity of the task 125 is determined from the data structure TASK which was set during step 640. In step 720, a check is made to see if the task (125) T is to be removed from the pool of active processors (150-153), either because of an exception or an I/O initiation during the running of the task. If not, the task 125 is put back in into the process queue (133) RunQ in step 730. If the task (125) T is to be removed from the pool of active processors (150-153), then in step 740 the processor that was running the task (125) T is deallocated and put into the idle queue of idle processors, where it may be marked as available for running other tasks if possible. It should be understood that processors in the idle queue may be turned off to reduce power and energy consumption. In step 750, a call may be made to proceed to the method 600 to see if it is possible to run a task on the processor that has just been freed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing was described in the context of servers and operating systems, it should be understood that other embodiments may be employed. For example, the system 100 may employ other processor driven devices such as personal computers, mainframes and the like. Also, computer-readable mediums other than an operating system may employed to manage the processors such as a logic device, a central processing unit, other microprocessors, microcontrollers, a finite state machine or a computer program product.

It should be understood, of course, that the foregoing relates to exemplary embodiments of the invention and that modifications may be made without departing from the spirit and scope of the invention as set forth in the following claims.

We claim:

1. A computer program product for managing power resources on a server, comprising a non-transitory computer-usable medium having computer-usable program code embodied therewith, the computer-usable program code being executed by a computer and causing the computer to perform the following:

determining a processor minimum operating frequency;

determining a number of processor cycles employed by the operation of a one or more licensed processors in a processor pool without one or more unlicensed processors being in operation;

computing a processor maximum frequency for running a task within a licensed capacity of the server;

in response to those of the processor cycles that are available for the task being less than those of the processor cycles that are required for the task, rescheduling the task for a future time period;

re-determining an available frequency range including the processor minimum operating frequency and the processor maximum frequency for running the task within the licensed capacity of the server;

activating an unlicensed and inactive processor within the processor pool to run the task;

adjusting processor frequencies of the licensed processors and the activated unlicensed processor to operate producing the same number of processor cycles determined during operation of the licensed processors without the unlicensed processor wherein activation of the unlicensed processor does not drop the operating frequency of each respective processor below the minimum operating frequency and wherein activation of the unlicensed processor does not raise the operating frequency of each respective processor above the maximum operating frequency; and executing the task using one of the activated unlicensed processors at the one of the adjusted frequencies.

2. The computer program product of claim 1 further comprising a set of instructions that determine if the number of processors used in the server is equal to or less than a number of processors licensed by a user.

3. The computer program product of claim 1 further comprising a set of instructions that adjust the operating frequency of any processor running tasks so that the total allocated number of processor cycles operating on the server does not exceed the number of processor cycles licensed to operate on the server without the activated processors running.

4. The computer program product of claim 1 further comprising a set of instructions that check if the task includes a user-specified or implied frequency for running the task.

5. The computer program product of claim 1 further comprising a set of instructions that compare a number of tasks being run on the server against a number of tasks available for processing under a licensed number of processors.

6. The computer program product of claim 1 further comprising a set of instructions in which the operating frequency of respective licensed and unlicensed processors after activation of the unlicensed processor is not identical.

* * * * *